US008667329B2

(12) United States Patent
Douros et al.

(10) Patent No.: US 8,667,329 B2
(45) Date of Patent: Mar. 4, 2014

(54) PROCESSING TRANSACTIONS IN GRAPH-BASED APPLICATIONS

(75) Inventors: Bryan Phil Douros, Framingham, MA (US); Matthew Darcy Atterbury, Lexington, MA (US); Craig W. Stanfill, Lincoln, MA (US); Joseph Skeffington Wholey, III, Belmont, MA (US); H. Mark Bromley, Lyndeborough, NH (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 12/638,588

(22) Filed: Dec. 15, 2009

(65) Prior Publication Data
US 2011/0078500 A1  Mar. 31, 2011

Related U.S. Application Data

(60) Provisional application No. 61/245,862, filed on Sep. 25, 2009.

(51) Int. Cl.
*G06F 11/00* (2006.01)

(52) U.S. Cl.
USPC ............................... 714/15; 707/703; 706/45

(58) Field of Classification Search
USPC ............................... 714/15; 707/703; 706/45
See application file for complete search history.

(56) References Cited

U.S. PATENT DOCUMENTS

| 3,662,343 | A | 5/1972 | Goldstein et al. |
| 3,662,401 | A | 5/1972 | Collins et al. |
| 4,922,418 | A | 5/1990 | Dolecek |

(Continued)

FOREIGN PATENT DOCUMENTS

| JP | 64-013189 | 1/1989 |
| JP | 06-236276 | 8/1994 |

(Continued)

OTHER PUBLICATIONS

Babaoglu, O et al., "Mapping parallel computations onto distributed systems in Paralex" Compuero '91. Advanced Computer Technology, Reliable Systems and Applications. 5th Annual European Computer Conference. Proceedings. Bologna, Italy May 13-16, 1991, Los Alamitos, CA, USA, IEEE Comput. Soc, US, May 13, 1991, pp. 123-130.

(Continued)

*Primary Examiner* — Loan L. T. Truong
(74) *Attorney, Agent, or Firm* — Fish & Richardson P.C.

(57) ABSTRACT

A graph-based computation has a plurality of nodes representing graph components connected by one or more links representing data flows between the components. Preparing the computation includes: identifying at least a first set of components to process a plurality of transactions in the computation; and associating with a first transaction a first group of one or more data records and data operations corresponding to the data records, and associating with a second transaction a second group of one or more data records and data operations corresponding to the data records. Executing the computation to process at least the first and second transactions includes delaying execution by the first set of components of a data operation corresponding to an initial data record of the second group until after execution by the first set of components of a data operation corresponding to a final data record of the first group.

52 Claims, 6 Drawing Sheets

(56) References Cited

U.S. PATENT DOCUMENTS

| | | | |
|---|---|---|---|
| 4,972,314 A | 11/1990 | Getzinger et al. | |
| 5,127,104 A | 6/1992 | Dennis | |
| 5,276,899 A | 1/1994 | Neches | |
| 5,280,619 A * | 1/1994 | Wang | 710/200 |
| 5,301,336 A | 4/1994 | Kodosky | |
| 5,323,452 A | 6/1994 | Dickman et al. | |
| 5,333,319 A | 7/1994 | Silen | |
| 5,357,632 A | 10/1994 | Pian et al. | |
| 5,495,590 A | 2/1996 | Comfort et al. | |
| 5,630,047 A | 5/1997 | Wang | |
| 5,692,168 A | 11/1997 | McMahan | |
| 5,701,400 A | 12/1997 | Amardo | |
| 5,712,971 A | 1/1998 | Stanfill et al. | |
| 5,745,778 A | 4/1998 | Alfieri | |
| 5,802,267 A | 9/1998 | Shirakihara et al. | |
| 5,805,462 A | 9/1998 | Poirot et al. | |
| 5,857,204 A | 1/1999 | Lordi et al. | |
| 5,923,832 A | 7/1999 | Shirakihara et al. | |
| 5,924,095 A | 7/1999 | White | |
| 5,930,794 A | 7/1999 | Linenbach et al. | |
| 5,933,640 A | 8/1999 | Dion | |
| 5,966,072 A * | 10/1999 | Stanfill et al. | 340/440 |
| 5,999,729 A | 12/1999 | Tabloski, Jr. et al. | |
| 6,006,242 A | 12/1999 | Poole et al. | |
| 6,012,094 A * | 1/2000 | Leymann et al. | 709/230 |
| 6,014,670 A | 1/2000 | Zamanian et al. | |
| 6,016,516 A | 1/2000 | Horikiri | |
| 6,032,158 A | 2/2000 | Mukhopadhhyay et al. | |
| 6,038,558 A | 3/2000 | Powers et al. | |
| 6,044,211 A | 3/2000 | Jain | |
| 6,044,374 A | 3/2000 | Nesamoney et al. | |
| 6,044,394 A | 3/2000 | Cadden et al. | |
| 6,088,716 A | 7/2000 | Stanfill et al. | |
| 6,145,017 A | 11/2000 | Ghaffari | |
| 6,173,276 B1 | 1/2001 | Kant et al. | |
| 6,208,345 B1 | 3/2001 | Sheard et al. | |
| 6,256,637 B1 * | 7/2001 | Venkatesh et al. | 1/1 |
| 6,259,988 B1 | 7/2001 | Galkowski et al. | |
| 6,272,650 B1 | 8/2001 | Meyer et al. | |
| 6,301,601 B1 | 10/2001 | Helland | |
| 6,314,114 B1 | 11/2001 | Coyle et al. | |
| 6,324,437 B1 | 11/2001 | Frankel et al. | |
| 6,330,008 B1 | 12/2001 | Razdow et al. | |
| 6,339,775 B1 | 1/2002 | Zamanian et al. | |
| 6,400,996 B1 | 6/2002 | Hoffberg et al. | |
| 6,401,216 B1 * | 6/2002 | Meth et al. | 714/16 |
| 6,437,796 B2 | 8/2002 | Sowizral et al. | |
| 6,449,711 B1 | 9/2002 | Week | |
| 6,480,876 B2 * | 11/2002 | Rehg et al. | 718/100 |
| 6,496,961 B2 | 12/2002 | Gupta et al. | |
| 6,538,651 B1 | 3/2003 | Hayman et al. | |
| 6,584,581 B1 | 6/2003 | Bay et al. | |
| 6,608,628 B1 | 8/2003 | Ross et al. | |
| 6,611,862 B2 | 8/2003 | Reisman | |
| 6,651,234 B2 | 11/2003 | Gupta et al. | |
| 6,654,907 B2 | 11/2003 | Stanfill et al. | |
| 6,658,464 B2 | 12/2003 | Reisman | |
| 6,715,145 B1 | 3/2004 | Bowman-Amuah | |
| 6,728,879 B1 | 4/2004 | Atkinson | |
| 6,813,761 B1 | 11/2004 | Das et al. | |
| 6,816,825 B1 | 11/2004 | Ashar et al. | |
| 6,832,369 B1 | 12/2004 | Kryka et al. | |
| 6,848,100 B1 | 1/2005 | Wu et al. | |
| 6,879,946 B2 | 4/2005 | Rong et al. | |
| 7,062,483 B2 | 6/2006 | Ferrari et al. | |
| 7,082,604 B2 | 7/2006 | Schneiderman | |
| 7,085,426 B2 | 8/2006 | August | |
| 7,103,597 B2 | 9/2006 | McGovern | |
| 7,103,620 B2 | 9/2006 | Kunz et al. | |
| 7,130,484 B2 | 10/2006 | August | |
| 7,137,116 B2 | 11/2006 | Parkes et al. | |
| 7,164,422 B1 | 1/2007 | Wholey et al. | |
| 7,165,030 B2 | 1/2007 | Yi et al. | |
| 7,167,850 B2 * | 1/2007 | Stanfill | 706/45 |
| 7,316,001 B2 * | 1/2008 | Gold et al. | 717/108 |
| 7,356,819 B1 | 4/2008 | Ricart et al. | |
| 7,398,514 B2 | 7/2008 | Ulrich et al. | |
| 7,417,645 B2 | 8/2008 | Beda et al. | |
| 7,457,984 B2 * | 11/2008 | Kutan et al. | 714/18 |
| 7,467,383 B2 * | 12/2008 | Inchingolo et al. | 718/104 |
| 7,505,975 B2 | 3/2009 | Luo | |
| 7,577,628 B2 | 8/2009 | Stanfill | |
| 7,636,699 B2 | 12/2009 | Stanfill | |
| 7,716,630 B2 | 5/2010 | Wholey et al. | |
| 7,756,940 B2 | 7/2010 | Sagawa | |
| 7,840,949 B2 * | 11/2010 | Schumacher et al. | 717/149 |
| 7,870,556 B2 | 1/2011 | Wholey et al. | |
| 7,877,350 B2 | 1/2011 | Stanfill et al. | |
| 7,979,479 B2 * | 7/2011 | Staebler et al. | 707/826 |
| 8,566,641 B2 * | 10/2013 | Douros et al. | 714/15 |
| 2001/0055019 A1 | 12/2001 | Sowizral et al. | |
| 2002/0080181 A1 | 6/2002 | Razdow et al. | |
| 2002/0087921 A1 | 7/2002 | Rodriguez | |
| 2002/0091747 A1 | 7/2002 | Rehg et al. | |
| 2002/0091748 A1 | 7/2002 | Rehg et al. | |
| 2002/0111876 A1 * | 8/2002 | Rudraraju et al. | 705/26 |
| 2002/0129340 A1 | 9/2002 | Tuttle | |
| 2002/0147745 A1 | 10/2002 | Houben et al. | |
| 2002/0184616 A1 | 12/2002 | Chessell et al. | |
| 2003/0004771 A1 | 1/2003 | Yaung | |
| 2003/0023413 A1 | 1/2003 | Srinivasa | |
| 2003/0033432 A1 | 2/2003 | Simpson et al. | |
| 2003/0091055 A1 | 5/2003 | Craddock et al. | |
| 2003/0126240 A1 | 7/2003 | Vosseler | |
| 2003/0204804 A1 | 10/2003 | Petri et al. | |
| 2004/0006745 A1 | 1/2004 | Van Helden et al. | |
| 2004/0041838 A1 | 3/2004 | Adusumilli et al. | |
| 2004/0073529 A1 | 4/2004 | Stanfill | |
| 2004/0093559 A1 | 5/2004 | Amaru et al. | |
| 2004/0098452 A1 * | 5/2004 | Brown et al. | 709/203 |
| 2004/0107414 A1 | 6/2004 | Bronicki et al. | |
| 2004/0111469 A1 | 6/2004 | Manion et al. | |
| 2004/0148373 A1 * | 7/2004 | Childress et al. | 709/223 |
| 2004/0177099 A1 * | 9/2004 | Ganesh et al. | 707/202 |
| 2004/0205726 A1 | 10/2004 | Chedgey et al. | |
| 2004/0207665 A1 | 10/2004 | Mathur | |
| 2004/0210831 A1 | 10/2004 | Feng et al. | |
| 2004/0225657 A1 | 11/2004 | Sarkar | |
| 2004/0260590 A1 | 12/2004 | Golani et al. | |
| 2005/0021689 A1 | 1/2005 | Marvin et al. | |
| 2005/0034112 A1 * | 2/2005 | Stanfill | 717/149 |
| 2005/0039176 A1 | 2/2005 | Fournie | |
| 2005/0059046 A1 | 3/2005 | Labrenz et al. | |
| 2005/0086360 A1 | 4/2005 | Mamou et al. | |
| 2005/0097561 A1 | 5/2005 | Schumacher et al. | |
| 2005/0102670 A1 | 5/2005 | Bretl et al. | |
| 2005/0144277 A1 | 6/2005 | Flurry et al. | |
| 2005/0144596 A1 | 6/2005 | McCullough et al. | |
| 2005/0149935 A1 | 7/2005 | Benedetti | |
| 2005/0177531 A1 | 8/2005 | Bracewell | |
| 2005/0193056 A1 | 9/2005 | Schaefer et al. | |
| 2005/0216421 A1 | 9/2005 | Barry et al. | |
| 2005/0240621 A1 | 10/2005 | Robertson et al. | |
| 2005/0262470 A1 | 11/2005 | Gavrilov | |
| 2005/0289527 A1 | 12/2005 | Illowsky et al. | |
| 2006/0085462 A1 * | 4/2006 | Todd | 707/100 |
| 2006/0095722 A1 | 5/2006 | Biles et al. | |
| 2006/0098017 A1 | 5/2006 | Tarditi et al. | |
| 2006/0206872 A1 | 9/2006 | Krishnaswamy | |
| 2006/0282474 A1 * | 12/2006 | MacKinnon, Jr. | 707/200 |
| 2006/0294150 A1 | 12/2006 | Stanfill et al. | |
| 2006/0294459 A1 | 12/2006 | Davis et al. | |
| 2007/0011668 A1 * | 1/2007 | Wholey et al. | 717/151 |
| 2007/0022077 A1 | 1/2007 | Stanfill | |
| 2007/0035543 A1 | 2/2007 | David et al. | |
| 2007/0094211 A1 | 4/2007 | Sun et al. | |
| 2007/0118839 A1 | 5/2007 | Berstis et al. | |
| 2007/0139441 A1 | 6/2007 | Lucas et al. | |
| 2007/0143360 A1 | 6/2007 | Harris et al. | |
| 2007/0150429 A1 | 6/2007 | Huelsman et al. | |
| 2007/0174185 A1 * | 7/2007 | McGoveran | 705/39 |
| 2007/0179923 A1 | 8/2007 | Stanfill | |
| 2007/0239766 A1 * | 10/2007 | Papaefstathiou et al. | 707/102 |
| 2007/0271381 A1 * | 11/2007 | Wholey et al. | 709/226 |

(56) References Cited

U.S. PATENT DOCUMENTS

| | | | |
|---|---|---|---|
| 2007/0285440 | A1 | 12/2007 | MacInnis et al. |
| 2008/0049022 | A1* | 2/2008 | Sherb et al. ................ 345/440 |
| 2008/0126755 | A1* | 5/2008 | Wu et al. ..................... 712/220 |
| 2008/0288608 | A1* | 11/2008 | Johnson ....................... 709/213 |
| 2008/0294615 | A1* | 11/2008 | Furuya et al. ................... 707/4 |
| 2009/0030863 | A1* | 1/2009 | Stanfill et al. ................ 706/45 |
| 2009/0064147 | A1* | 3/2009 | Beckerle et al. ............ 718/101 |
| 2009/0083313 | A1* | 3/2009 | Stanfill et al. ............... 707/102 |
| 2009/0182728 | A1* | 7/2009 | Anderson ........................ 707/5 |
| 2009/0193417 | A1* | 7/2009 | Kahlon ........................ 718/100 |
| 2009/0224941 | A1* | 9/2009 | Kansal et al. ............ 340/870.06 |
| 2009/0327196 | A1* | 12/2009 | Studer et al. ................... 706/47 |
| 2010/0070955 | A1* | 3/2010 | Kahlon ........................ 717/141 |
| 2010/0169137 | A1* | 7/2010 | Jastrebski et al. ................ 705/7 |
| 2010/0174694 | A1* | 7/2010 | Staebler et al. ............. 707/703 |
| 2010/0180344 | A1 | 7/2010 | Malyshev et al. |
| 2010/0211953 | A1 | 8/2010 | Wakeling et al. |
| 2010/0218031 | A1* | 8/2010 | Agarwal et al. .................. 714/2 |
| 2010/0281488 | A1* | 11/2010 | Krishnamurthy et al. .... 718/106 |
| 2011/0093433 | A1 | 4/2011 | Stanfill et al. |
| 2012/0054255 | A1 | 3/2012 | Buxbaum |

FOREIGN PATENT DOCUMENTS

| | | |
|---|---|---|
| JP | 08-278892 | 10/1996 |
| JP | 08-305576 | 11/1996 |
| JP | 63-231613 | 9/1998 |
| JP | 11-184766 | 7/1999 |
| JP | 2000-99317 | 4/2000 |
| JP | 2002-229943 | 8/2002 |
| JP | 2005-317010 | 11/2005 |
| JP | 2006-504160 | 2/2006 |
| WO | WO 98/00791 | 1/1998 |
| WO | WO 02/11344 | 2/2002 |
| WO | WO2005/001687 | 1/2005 |
| WO | WO 2005/086906 | 9/2005 |
| WO | WO 2008/124319 | 10/2008 |
| WO | WO 2009/039352 | 3/2009 |

OTHER PUBLICATIONS

Baer, J.L. et al., "Legality and Other Properties of Graph Models of Computations." Journal of the Association for Computing Machinery, vol. 17, No. 3, Jul. 1970, pp. 543-554.

Bookstein, A. et al., "Modeling Word Occurrences for the Compression of Concordances." ACM Transactions on Information Systems, vol. 15, No. 3, Jul. 1997, pp. 254-290.

Cytron, Ron et al., "Efficiently Computing Static Single Assignment Form and the Control Dependence Graph." ACM Transactions on Programming Languages and Systems, vol. 13, No. 4, Oct. 1991, pp. 451-490.

Ebert, Jurgen et al., "A Declarative Approach to Graph-Based Modeling." Workshop on Graph-Theoretic Concepts in Computer Science, 1994, pp. 1-19.

European Search Report issued in application No. EP10003554, dated Sep. 24, 2010, 7 pages.

Gamma et al. "Design Patterns: Elements of Reusable Object-Oriented Software", Sep. 1999.

International Search Report & Written Opinion issued in PCT application No. PCT/US08/71206, mailed Oct. 22, 2008, 12 pages.

International Search Report & Written Opinion issued in PCT application No. PCT/US10/49966, dated Nov. 23, 2010, 8 pages.

Jawadi, Ramamohanrao et al., "A Graph-based Transaction Model for Active Databases and its Parallel Implementation." U. Florida Tech. Rep TR94-0003, 1994, pp. 1-29.

Kebschull, U. et al., "Efficient Graph-Based Computation and Manipulation of Functional Decision Diagrams." University of Tubingen, 1993 IEEE, pp. 278-282.

Li, Xiqing et al., "A Practical External Sort for Shared Disk MPPs." Proceedings of Supercomputing '93, 1993, 24 pages.

Martin, David et al., "Models of Computations and Systems—Evaluation of Vertex Probabilities in Graph Models of Computations." Journal of the Association for Computing Machinery, vol. 14, No. 2, Apr. 1967, pp. 281-299.

Ou, Chao-Wei et al., "Architecture-Independent Locality-Improving Transformations of Computational Graphs Embedded in $k$-Dimensions." Proceedings of the $9^{th}$ International Conference on Supercomputing, 1995, pp. 289-298.

"RASSP Data Flow Graph Design Application Note." International Conference on Parallel Processing, Dec. 2000, Retrieved from Internet <http://www.atl.external.lmco.com/projects/rassp/RASSP_legacy/appnotes/FLOW/APNOTE_FLOW_02 >, 5 pages.

Stanfill, Craig, "Massively Parallel Information Retrieval for Wide Area Information Servers." 1991 IEEE International Conference on Systems, Man and Cybernetics, Oct. 1991, pp. 679-682.

Stanfill, Craig et al., "Parallel Free-Text Search on the Connection Machine System." Communications of the ACM, vol. 29, No. 12, Dec. 1986, pp. 1229-1239.

Stanfill, Craig, "The Marriage of Parallel Computing and Information Retrieval." IEE Colloquium on Parallel Techniques for Information Retrieval, Apr. 1989, 5 pages.

Supplemental European Search Report issued in application No. EP08796632, dated Sep. 24, 2010, 6 pages.

Wah, B.W. et al., "Report on Workshop on High Performance Computing and Communications for Grand Challenge Applications: Computer Vision, Speech and Natural Language Processing, and Artificial Intelligence." IEEE Transactions on Knowledge and Data Engineering, vol. 5, No. 1, Feb. 1993, 138-154.

Burch, J.R. et al., "Sequential circuit verification using symbolic model checking." In Design Automation Conference, 1990, Proceedings of the $27^{th}$ ACM/IEEE. Jun. 24-28, 1990, pp. 46-51.

Guyer et al., "Finding Your Cronies: Static Analysis for Dynamic Object Colocation." Oct. 2004, ACM, pp. 237-250.

Grove et al., "A Framework for Call Graph Construction Algorithms." Nov. 2001, ACM TOPLAS, vol. 23, Issue 6, pp. 685-746.

Herniter, Marc E., "Schematic Capture with MicroSim PSpice," $2^{nd}$ Edition, Prentice Hall, Upper Saddle River, N.J., 1996, pp. 51-52, 255-280, 292-297.

International Search Report & Written Opinion issued in PCT application No. PCT/US01/23552, mailed Jan. 24, 2002, 5 pages.

International Search Report & Written Opinion issued in PCT application No. PCT/US06/24957, dated Jan. 17, 2008, 14 pages.

International Search Report & Written Opinion issued in PCT application No. PCT/US07/75576, mailed Sep. 16, 2008, 13 pages.

International Search Report & Written Opinion received in PCT application No. PCT/US10/24036, mailed Mar. 23, 2010, 11 pages.

Just et al., "Review and Analysis of Synthetic Diversity for Breaking Monocultures." Oct. 2004, ACM, pp. 23-32.

Krahmer et al., "Graph-Based Generation of Referring Expressions." Mar. 2003, MIT Press, vol. 29, No. 1, pp. 53-72.

Supplemental European Search Report issued in application No. EP07813940, dated Nov. 26, 2009, 7 pages.

International Search Report & Written Opinion received in PCT application No. PCT/US2011/040440, mailed Oct. 12, 2011, 13 pages.

Control-M; New Dimension Software. User Manual. New Dimension Software Ltd., 1999.

Romberg, M., "UNICORE: Beyond Web-based Job-Submission," Proceedings of the 42nd Cray User Group Conference, Noordwijk (May 22-26, 2000).

"Unicenter AutoSys Job Management," Computer Associates, Copyright 2001.

Krsul, Ivan et al., "VMPlants: Providing and Managing Virtual Machine Execution Environments for Grid Computing." Proceedings of the ACM/IEEE SC2004 Conference on Supercomputing, 2001, Nov. 6-12, 2004, 12 pages.

Vajracharya, Suvas et al., "Asynchronous Resource Management." Proceedings of the $15^{th}$ International Parallel and Distributed Processing Symposium, Apr. 2001, 10 pages.

Japanese Office Action, with English Translation, JP application No. 2008-519474, mailed Sep. 25, 2012, 8 pages.

Shoten, Iwanami, "Encyclopedic Dictionary of Computer Science," (with English Translation), May 25, 1990, p. 741.

Japanese Office Action, with English Translation, JP application No. 2009-523997, mailed Oct. 23, 2012, 7 pages.

(56) References Cited

OTHER PUBLICATIONS

European Search Report issued in application No. EP10741775, dated Nov. 14, 2012, 4 pages.
Russell, Nick, et al., "Workflow Control-Flow Patterns a Revised View," Workflow Patterns Initiative, 2006, pp. 1-134.
van der Aalst, W.M.P., et al., "Workflow Patterns," Distributed and Parallel Databases, 14, 5-51, 2003.
Japanese Office Action, with English Translation, JP application No. 2011-000948, mailed Jan. 8, 2013, 11 pages.
Supplemental European Search Report issued in application No. EP06774092, dated Dec. 19, 2012, 5 pages.
"Topological sorting," Wikipedia, accessed Dec. 10, 2012, 2 pages.
"Visual Lint: Squash Bugs Early with Interactive C/C++, C# and Java Code Analysis for Microsoft Visual Studio and Eclipse," [retrieved from the internet Dec. 3, 2012: www.riverblade.co.uk/products/visual_lint.] (2 pages).
Japanese Office Action, with English Translation, JP application No. 2010-518415, mailed Feb. 21, 2013, 11 pages.
U.S. Appl. No. 09/627,252.
U.S. Appl. No. 10/268,509.
U.S. Appl. No. 11/467,724.
U.S. Appl. No. 11/733,579.
U.S. Appl. No. 11/169,014.
U.S. Appl. No. 11/167,902.
U.S. Appl. No. 12/977,545.
U.S. Appl. No. 11/836,349.
U.S. Appl. No. 12/180,141.
U.S. Appl. No. 12/704,998.
U.S. Appl. No. 13/161,010.
U.S. Appl. No. 13/678,921.
U.S. Appl. No. 13/678,928.
Japanese Office Action for Japanese Application No. 2010-518415, with English Translation, dated Nov. 18, 2013, 11 pages.
Dillon, Laura K., et al., "Inference Graphs: A Computational Structure Supporting Generation of Customizable and Correct Analysis Components," IEEE Transactions on Software Engineering, vol. 29, No. 2, Feb. 2003, pp. 133-150.
Evripidou, Paraskevas, et al., "Incorporating input/output operations into dynamic data-flow graphs," Parallel Computing 21 (1995) 1285-1311.
Extended European Search Report, EP 12165575, mailed May 10, 2013, 9 pages.
Frankl, Phyllis G., et al., "An Applicable Family of Data Flow Testing Criteria," IEEE Transactions on Software Engineering, vol. 14, No. 10, Oct. 1988, pp. 1483-1498.
Whiting, Paul G., et al., "A History of Data-Flow Languages," IEEE Annals of the History of Computing, vol. 16, No. 4, 1994, pp. 38-59.

\* cited by examiner

PROCESSING TRANSACTIONS IN GRAPH-BASED APPLICATIONS

CROSS-REFERENCE TO RELATED APPLICATIONS

This application claims priority to U.S. Application Ser. No. 61/245,862, filed on Sep. 25, 2009, incorporated herein by reference.

BACKGROUND

This disclosure relates to processing transactions in graph-based applications.

Complex computations can often be expressed as a data flow through a directed graph, with components of the computation being associated with the vertices of the graph and data flows between the components corresponding to links (arcs, edges) of the graph. A system that implements such graph-based computations is described in U.S. Pat. No. 5,966,072, EXECUTING COMPUTATIONS EXPRESSED AS GRAPHS. One approach to executing a graph-based computation is to execute a number of processes, each associated with a different vertex of the graph, and to establish communication paths between the processes according to the links of the graph. For example, the communication paths can use TCP/IP or UNIX domain sockets, or use shared memory to pass data between the processes.

SUMMARY

In one aspect, in general, a computer-implemented method includes preparing a graph-based computation having a plurality of nodes representing graph components connected by one or more links representing data flows between the graph components by identifying at least a first set of graph components to process a plurality of transactions in the computation; and associating with a first transaction a first group of one or more data records and data operations corresponding to the data records, and associating with a second transaction a second group of one or more data records and data operations corresponding to the data records. The method includes executing the graph-based computation to process at least the first and second transactions, including delaying execution by the first set of graph components of a data operation corresponding to an initial data record of the second group until after execution by the first set of graph components of a data operation corresponding to a final data record of the first group.

The aspect can include one or more of the following features.

Executing the graph-based computation can include executing the first and second transactions as a first batch of transactions by processing the data records and data operations corresponding to the first and second transactions; and upon detecting a failure, rolling back the first batch of transactions by rolling back all processed data records and data operations corresponding to the processed transactions.

The method can also include specifying a first graph component having at least an output port as a beginning of a data flow for the first t of graph components; and specifying a second graph component having at least an input port as an end of the data flow for the first set of graph components.

The method can also include dynamically invoking the first set of graph components to process the one or more transactions.

The method can also include, upon successfully processing substantially all transactions in the first batch of transactions, committing the first batch of transactions. Committing the first batch of transactions can include committing all the data operations corresponding to each one of the transactions in the first batch of transactions at substantially the same time.

Detecting a failure can include, for example, detecting a failure of any of the data operations corresponding to each one of the data records in a transaction of the first batch of transactions.

The method can also include, after detecting the failure, re-processing, as a second different batch of transactions, unprocessed transactions of the first batch of transactions and the processed transactions that were not committed during processing of the first batch of transactions.

The method can also include, after detecting the failure, re-processing, as a series of discrete batches, each one of the processed and unprocessed transactions associated with the first batch of transactions.

The method can also include, upon detecting the failure, identifying one or more transactions that failed as failed transactions, re-processing, as a second different batch, the first batch of transactions excluding the failed transactions, and re-processing, as third batch, the failed transactions.

The method can also include, in the course of executing the first transaction, performing one or more data operations in a first database by a set of graph components belonging to the graph-based computation. The method can also include, in the course of executing the first transaction, establishing a first session with the first database, the first session being shared by one or more of a first set of graph components processing the first transaction.

A size of the first transactions can be specified by a user.

In another aspect, in general, a computer-readable medium stores a computer program including instructions for causing a computer to prepare a graph-based computation having a plurality of nodes representing graph components connected by one or more links representing data flows between the graph components, including identifying at least a first set of graph components to process a plurality of transactions in the computation, associating with a first transaction a first group of one or more data records and data operations corresponding to the data records, and associating with a second transaction a second group of one or more data records and data operations corresponding to the data records, and execute the graph-based computation to process at least the first and second transactions, including delaying execution by the first set of graph components of a data operation corresponding to an initial data record of the second group until after execution by the first set of graph components of a data operation corresponding to a final data record of the first group.

In another aspect, in general, a computer system includes means for preparing a graph-based computation having a plurality of nodes representing graph components connected by one or more links representing data flows between the graph components, including identifying at least a first set of graph components to process a plurality of transactions in the computation, and associating with a first transaction a first group of one or more data records and data operations corresponding to the data records, and associating with a second transaction a second group of one or more data records and data operations corresponding to the data records; and means for executing the graph-based computation to process at least the first and second transactions, including delaying execution by the first set of graph components of a data operation corresponding to an initial data record of the second group until after execution by the first set of graph components of a data operation corresponding to a final data record of the first group.

The details of one or more embodiments of the invention are set forth in the accompanying drawings and the description below. Other features, objects, and advantages of the invention will be apparent from the description and drawings, and from the claims.

DETAILED DESCRIPTION

FIG. 1 is a block diagram of a graph based system.

FIGS. 2, 3, and 4 are example dataflow graphs showing transaction processing.

Figure 1:
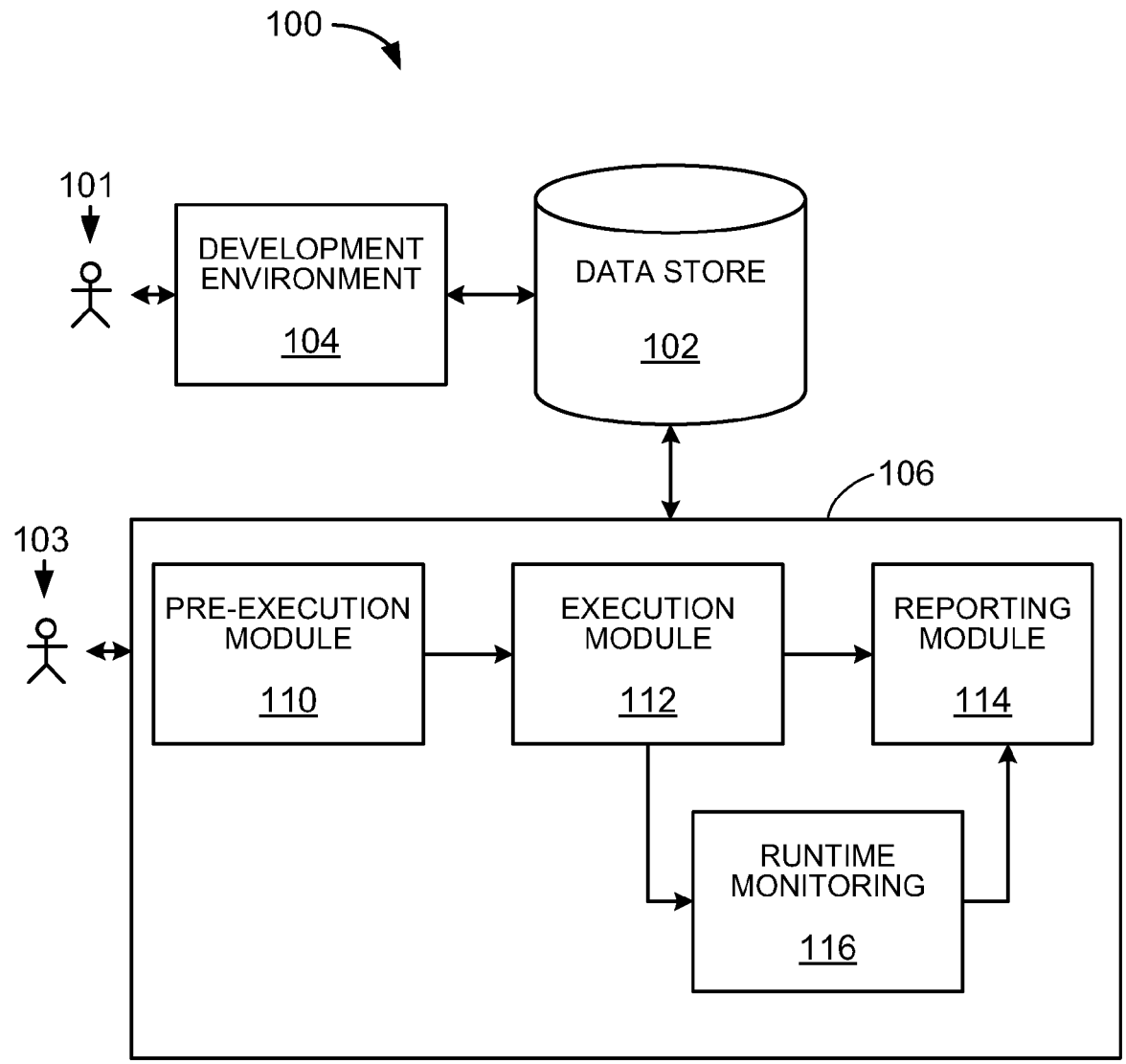

Referring to FIG. 1, a computing system 100 for executing graph-based computations includes a development environment 104 coupled to a data storage 102 and a runtime environment 106 coupled to the data storage 102. A developer 101 builds applications using the development environment 104. An application is associated with one or more dataflow graphs specified by data structures in the data storage 102 which may be written to the data storage 102 as a result of the developer's use of the development environment 104. A data structure specifies, for example, the vertices (representing components or data sets) of a dataflow graph and links (representing data flows) between the vertices. The data structures can also include various characteristics of the components, data sets, and data flows of the graphs. A data processing application, for example, may be associated with a dataflow graph that implements computations performed on data flowing from one or more input data sets, through a graph of processing components, to one or more output data sets.

The runtime environment 106 may be hosted on one or more general-purpose computers under the control of a suitable operating system, such as the UNIX operating system. For example, the runtime environment 106 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof. Concurrent execution of multiple components in a graph provides one form of parallelism. Additional parallelism can be achieved by distributing different components of a graph to different computing nodes (e.g., different CPUs). Elements of a graph (e.g., data sets, components, and flows) can be explicitly or implicitly replicated to introduce parallelism into the runtime environment 106.

A user 103 can interact with the runtime environment 106, for example, using a command line or graphical interface. The runtime environment 106 includes a pre-execution module 110 to read the stored graph data structure specifying a given dataflow graph, and to allocate and configure computing resources such as processes for performing the computations of a component (e.g., a process or thread of execution within the host operating system).

The runtime environment 106 also includes an execution module 112 to schedule and control execution of the processes assigned to a dataflow graph by the pre-execution module 110. The execution module 112 can interact with external computing resources coupled to the system 100 such as database engines, data storage, or other modules that are accessed during processing associated with the graph components.

After execution of a dataflow graph, or at predetermined intervals during execution, a reporting module 114 provides information characterizing a given computation, such as statistics associated with the individual components of the dataflow graph. Some of the information reported by the reporting module 114 is obtained from outputs generated by the dataflow graph. Some of the information reported is obtained by monitoring execution of the dataflow graph.

A runtime monitoring module (RMM) 116 monitors execution of one or more processes assigned to a dataflow graph and provides information to the reporting module 114. The information includes, for example, central processing unit (CPU) time devoted to running each component, or amount of data processed by each component.

Figure 2:
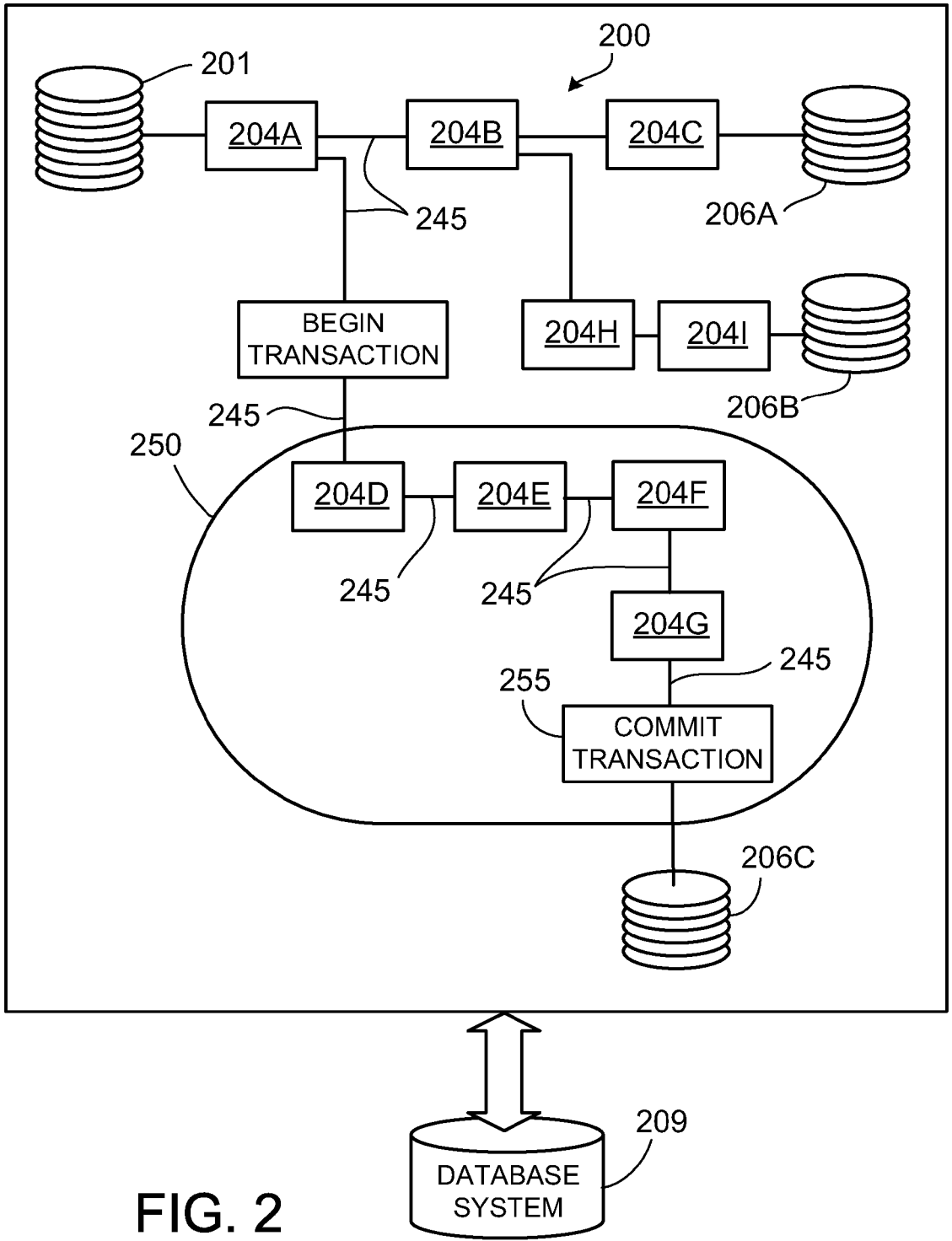

Referring to FIG. 2, an example dataflow graph 200 includes an input data set 201 having one or more input data records to be processed by the components 204A-204I (generally 204) of the dataflow graph 200. In some implementations, the input data records 201 enter one or more input ports of a component 204, and output data records (which are in some cases the input data records 201, or processed versions of the input data records 204) typically leave one or more output ports of the component 204. In some implementations, the processing of a single input data record 201 can result in multiple output data records. In graph 200, the output data records from components 204C, 204I, and 255 are stored in output data sets 206A-206C (generally 206). An example dataflow graph 200 is described in greater detail in U.S. application Ser. No. 11/434,623, filed May 16, 2006, which is incorporated herein by reference.

The flow of records from the output of an upstream component (e.g., 204A) to a downstream component (e.g., 204B or 240) is generally allowed to occur over any of the dataflow links 245 concurrently. This allows different components 204 in the dataflow graph 200 to perform tasks concurrently on different records, which provides a form of pipeline parallelism for the overall computation being performed by the dataflow graph 200. In other words, a given part of the computation is performed by upstream components 204 on a given set of records in parallel with a different part of the computation being performed by downstream components 204 on a different set of records.

The dataflow graph 200 may run on parallel processing systems and make changes to multiple external collections of data (such as files and databases) by a combination of file manipulation operations (such as creating, deleting and renaming) and data manipulation operations (such as reading and writing). One such external collection of data is the database system 209. The components 204 of the dataflow graph 200 are configured to access the database system 209. In this regard, the data records being processed by the graph 200 are associated with one or more data operations to be performed on the database system 209.

Figure 3:
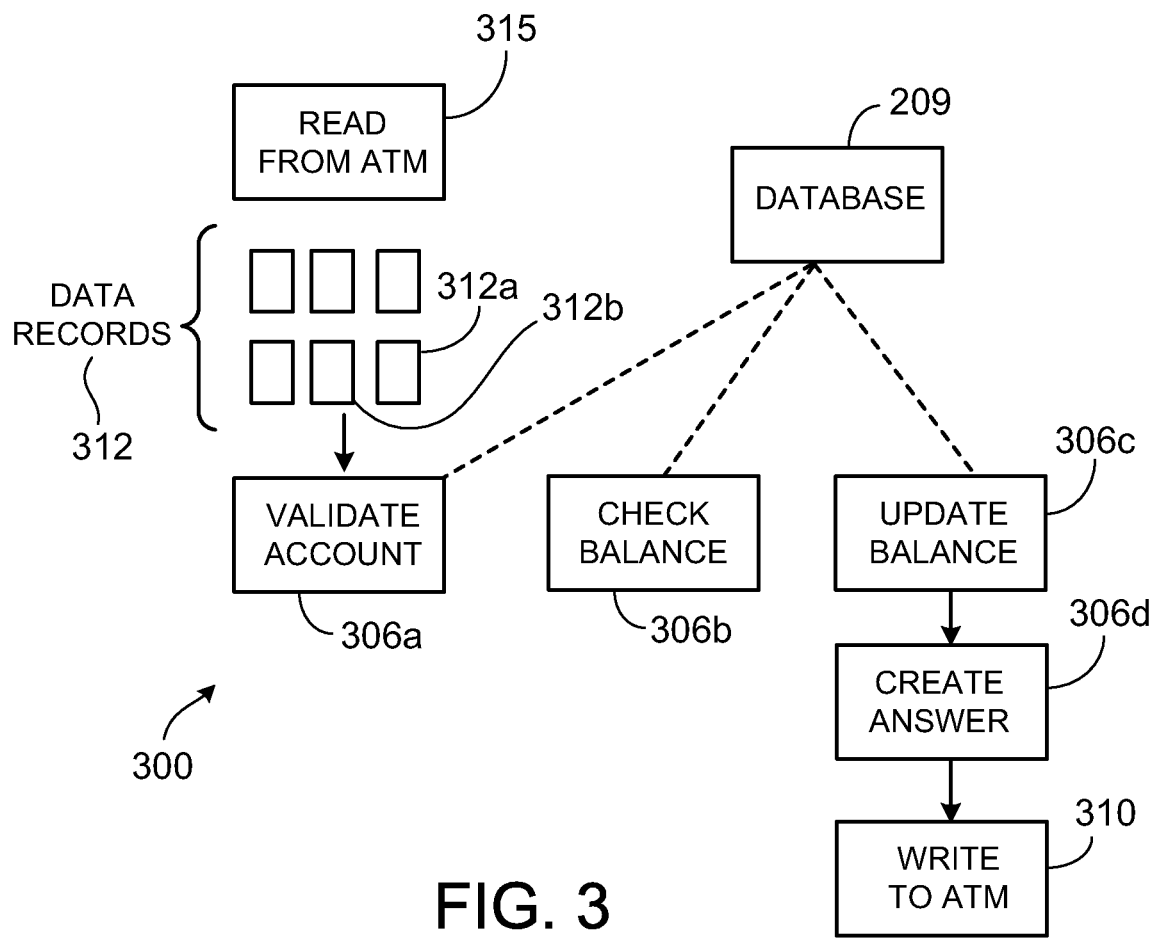

In an implementation, the components 204 can be configured to provide transactional properties, as described in more detail below. By way of an example, referring to FIG. 3, consider the computation graph 300 for updating a bank customer's record based on information received from the customer's session at an automated teller machine (ATM). In operation, the component 315 reads the information from the ATM and produces data records 312 and associated data operations to be carried out in the database system 209 based on the information. As shown, the components "Validate Account" 306a, "Check Balance" 306b, and "Update Balance" 306c all access the same database system 209. A first data record 312a carrying information about a customer's personal identification number (PIN) that is entered into the ATM is processed by "Validate Account" 206a. Also, a second data record 312b carrying information indicating that the customer's account be debited a certain amount is processed by "Update Balance" 306c.

If the first data record 312a is processed independently of the second data record 312b, then the independent commits to the database 209 would result in the database possibly updating an account's balance before the customer's information is validated. As such, the data contained in the database system 209 would not be in a desired form. To address this situation, the data records 312 and associated operations that need to be committed or failed (i.e., rolled back) together as a single unit are grouped as a transaction that is committed as a whole only after all the records 312 and operations corresponding to the records 312 are processed. The records 312 that are grouped together to be processed as part of the same transaction can be called a "unit of work." Further, different transactions can optionally be grouped together into a batch of transactions that are processed as a unit such that the transactions in the batch are either committed together or the entire batch is rolled back. The size of a batch of transactions, i.e., the number of transactions in the batch, can be specified by a user, or automatically determined by the pre-execution module 110 (FIG. 1). Further, the components 315, 306a-d, and 310 are grouped together into a set corresponding to a transactional unit as described in detail below. As such, the data records 312 are processed by the transactional unit in individual transactions or batches of transactions that are each committed to the database 209 as independent and distinct units.

In this example, the components 306a-c are each configured to access, e.g., receive, modify, and/or delete, data in the database system 209. A series of data records 312 are received as input by the "read" component 315. When processing of the data records 312 and associated data operations result in permanent changes to the database system 209, the changes are said to be "committed." Such committed changes are made visible to all processes within the computing system 100. In this regard, the commit operations are carried out for each transaction corresponding to data records 312 and associated operations to make changes effected by the data records 312 and associated data operation permanent in the database system 209. If a failure occurs, the failed transaction including the data records 312 and associated data operations can be rolled back (i.e., the earlier state of the database system 209 before the operation was performed can be restored) as a single unit, and the data records 312 and associated operations can be either discarded, or re-processed after addressing the reason for failure. Failure can occur for a variety of reasons. For example, the failure can be a system failure, e.g., an error in memory allocation or a conflict in writing to a memory space. The failure could also be a failure in the underlying data operation, e.g., attempting to withdraw funds from a depleted account. In such a scenario, the transaction including the data records 312 and associated data operations would fail.

In general, committing after processing every transaction including data records 312 and associated data operations can be expensive. In a typical commit operation, the database system 209 writes to a physical disk (e.g., a hard disk that stores data associated with the database system 209) every modification made by the data operation to the database system 209. In some examples, a log file (not shown) may also need to be updated thus increasing further the number of processing cycles involved in carrying out the commit operation. As such, a commit operation may require considerable resources and processing cycles. As such, the exemplary techniques described herein for grouping commit operations for a batch of multiple transactions reduce some of this expense and conserves resources.

As described above, processing an incoming flow of data records in units of work associated with separate transactions enables certain transactional properties (e.g., isolation, as described in more detail below) by suppressing the pipeline parallelism that would otherwise be present within a set of components handling operations for those transactions. Referring again to FIG. 2, a transaction can be carried out by a portion of the computation defined by the overall dataflow graph 200. For example, a transaction that is carried out in connection with the database system 209 may involve only components 204D-G that communicate with the database system 209. Along these lines, in an implementation, a set 250 can be defined for carrying out the transaction involving components 204D-G. In this manner, the set 250 of components 204D-G can collectively perform the operations on the data records involved in the transaction. In some examples, there can be more than one set 250 of components, each carrying out different types of transactions. A set 250 can be established in various ways. For example, the set 250 can be established before the graph is executed. In some examples, the sets can be established during startup of the graph. A component (not shown) can be defined by a user to dynamically invoke the sets. In some implementations, in executing the dataflow graph 200, the pre-execution module 110 (FIG. 1) can identify the components 204 to be part of the set 250 for processing the transaction.

In an implementation, the set 250 can be established through the use of one or more special components 240, 255 that delimit the beginning and end of the transaction processing for a given transaction. In some examples, the components 240, 255 can be specified by a designer (e.g., developer 101 of FIG. 1) before the graph 200 is deployed to the user (e.g., user 103 of FIG. 1). In some examples, the components 240, 255 can be specified by an end-user 103 having the ability to modify the graph 200. As shown, a first component, e.g., "Begin Transaction" (BT) 240 having at least an output port can be specified as a beginning of a data flow 245 for a transaction, and a second component, e.g., "End Transaction" (ET) 255, having at least an input port can be specified as an end of the data flow 245 for the transaction. In some implementations, the set 250 of components 204 that perform the operations of a transaction associated with the data records of the transaction is called a Transactional Unit (TU). Pipeline parallelism can be suppressed within a TU by ensuring that only the data records for a single transaction that is being handled is allowed to flow into the TU. Data records for the next transaction to be handled by the TU can flow into the TU after the previous transaction has been completed (e.g., by being committed). The BT 240 and ET 250 can communicate to enforce this condition. A dataflow graph 200 can have multiple TUs.

In some implementations, at startup, the graph 200 can be analyzed to determine the components 204 in the set 250. The components 204 in the set 250 can be executed in a single process. In this approach, the pre-execution module 110 (FIG. 1) divides the components 204 of the graph 200 into one or more sets each containing one or more components 204. Each set containing the one or more components 204 can be assigned a different process. Thus, for the one or more components 204 that are placed into the same set, the computations represented by those components 204 can be "folded together" to execute within the same process. The one or more of the components 204 in a process are executed serially. In this manner, the records are passed from one component 204 to the next within the process in the order that they could have executed if they were in separate processes.

For the components 204 in a given set 250, the BT 240 and ET 255 are specified as described above. There can be one input to the BT 240, an optional output from one or more ETs 255, and other outputs from the components in the set 250. In some implementations, there can be components upstream of the BT 240 (e.g., component 204A) and downstream of the ET 255.

In an implementation, a component 204 that may potentially participate in processing a given transaction can use a "discovery" process to indicate to the BT 240 that they are part of the set 250. For example, components 204D-G are part of the set 250. Each component 204 that is folded into a single process can include a start-up routine that is called during start-up of the transaction. Each of the components 204D-G is assigned a parameter specifying a name of the set 250. During start up, the components 204D-G register themselves as components 204 assigned to the set 250 so that the BT 240 can know the components 204D-G involved in processing a given transaction.

In one example, a new transaction starts when the BT 240 receives a data record 201 while no other transaction is active. At the start of the transaction, the BT 240 instructs each component 204 and the ET 255 to begin the processing the transaction. Data records 201 associated with the transaction are passed between the components 204D-G as part of the data flow 245 in the transaction. At the end of processing the transaction the ET 255 enables the results of the transaction to be committed or aborted, as described above.

Further, in some implementations, one or more components 204D-G in the set 250 can share a connection to access the database system 209. As such, in the course of executing a transaction using the components 204D-G in the set 250, a session can be established with the database system 209 and shared by the components 240D-G in the set 250. In this manner, in the context of processing a batch of transactions, all data records and associated data operations relevant to the database system 209 can be processed within the same database session.

To improve reliability in the computation graph context, the TUs of the dataflow graph 200 are configured to implement transactions providing the "ACID" properties, i.e., the system 100 ensures "atomicity," "consistency," "isolation," and "durability" with respect to the data records 201 and associated data operations for a given transaction. For example, to meet the atomicity property, the TU interacts with the database system 209 such that all operations associated with changes to the database system 209 performed within a single transaction are committed together. For example, in the example of FIG. 3, the update to the customer's account will occur successfully only if the customer's information is successfully validated. Similarly, for an application that transfers funds from one account to another, the atomicity property ensures that, if a debit is made successfully from one account, the corresponding credit is made to another account. In this manner, all the changes are performed in the database system 209, or none of the changes are performed.

In addition to atomicity, the system 100 ensures that the data in the database 209 is in a consistent state when a transaction starts and ends. This ensures that the database 209 meets the "consistency" property. For example, in an application that transfers funds from one account to another, the consistency property ensures that the total value of funds in both the accounts is the same at the start and end of each transaction.

Further, the system 100 ensures an intermediate state of a transaction is invisible to other transactions. This ensures that the system 100 meets the "isolation" property. For example, in an application that transfers funds from one account to another, another transaction sees the transferred funds in one account or the other, but not in both.

Finally, after a transaction successfully completes, the system 100 ensures that changes to data persist and are not lost, even in the event of a system failure. This ensures that the system 100 meets the "durability" property. For example, in an application that transfers funds from one account to another, the durability property ensures that the changes made to each account will not be lost.

Techniques can be used to deal with failures during the processing of a transaction. If a failure occurs, partial changes may have been made to the database system 209, which render that data in the database system 209 unusable by the current application or other applications until corrected. Typically, this will happen if a record in the database system 209 has been modified, deleted, or created in the course of a computation. In parallel processing systems, the problem is intensified since the database system 209 will often be spread over many different computing systems and storage units (e.g., magnetic disks), making the work required to "roll back" the state of the data increase proportionately with the number of storage units.

To recover from such failures, it can be necessary to shut down the current (i.e., failed) application, and then either undo all changes made by the application since its start (a "full rollback"), or restore the state of the system to an intermediate "checkpoint" and restart execution from that point (a "partial rollback").

As suggested above, a feature of the dataflow graph 200 is that the data records 201 and their corresponding data operations can be associated with multiple transactions. The data record 201 and corresponding data operations associated with a given transaction can either be committed (i.e., made permanent) or rolled back (i.e., undone) as a single unit.

Figure 4:
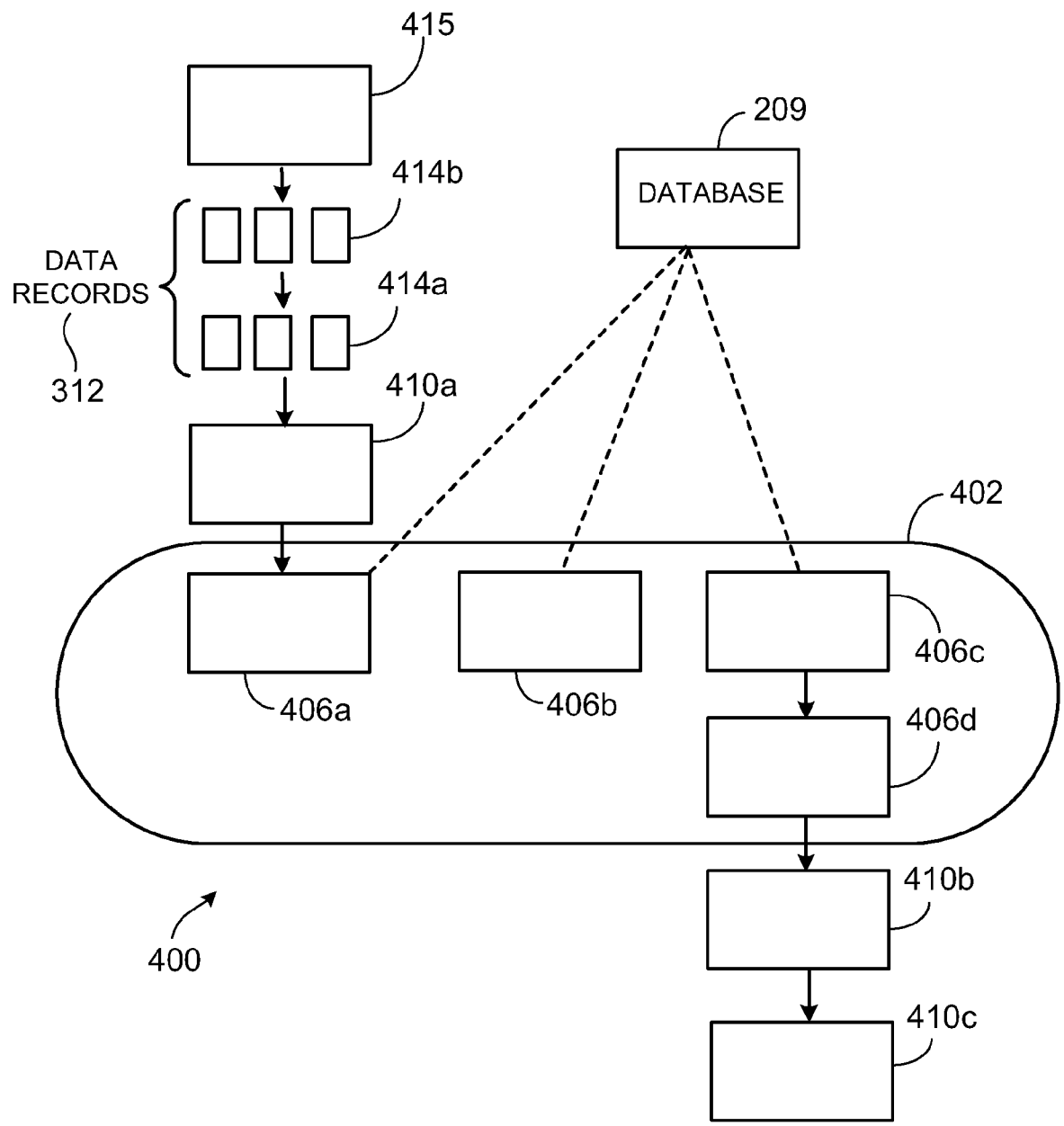

Referring now to FIG. 4, a dataflow graph 400 includes graph components 406a-d (generally 406) and 410a-c (generally 410). As shown, a set 402 of the components 406 is defined as a TU for processing transactions. Further, the components 406 are in communication with the database system 209. In an implementations, certain components, e.g., components 410, are not included in the set 402, and therefore do not participate in the processing of the transaction associated with the set 402.

In an implementation, the input data records 312 are grouped together into a batch of transactions 414a, 414b (generally 414) that each corresponds to a different group of records in a "unit of work" to be processed in the TU 402. The grouping of data records 312 into units of work for transactions 414 can be done in a variety of ways. For example, a user 103 can define a transaction size (i.e., a number of data records 312) for each transaction 414. In some examples, the pre-execution module 110 (FIG. 1) can automatically divide the data records into transactions 414 based on e.g., a predetermined feature of the data records. For example, if the data records 312 are a stream of line item records from e.g., a checkout cash register, then each record 312 may contain features, e.g., a "register number," a "transaction number," an "item number," an "item code," and a "price." If each sale occurring at the checkout register needs to be evaluated as a single transaction, then all the records 312 can be grouped together into a single transaction 414 based on the "register number" and/or "transaction number."

In an example, to provide isolation between different transactions, only one transaction, e.g., transaction 414a, is processed by the components 406a-d of the set 402 at a time. Accordingly, only after the last data record of the transaction 414a has been processed by the last component 406d can first data record of the transaction 414b be processed by the first component 406a.

Figure 5:
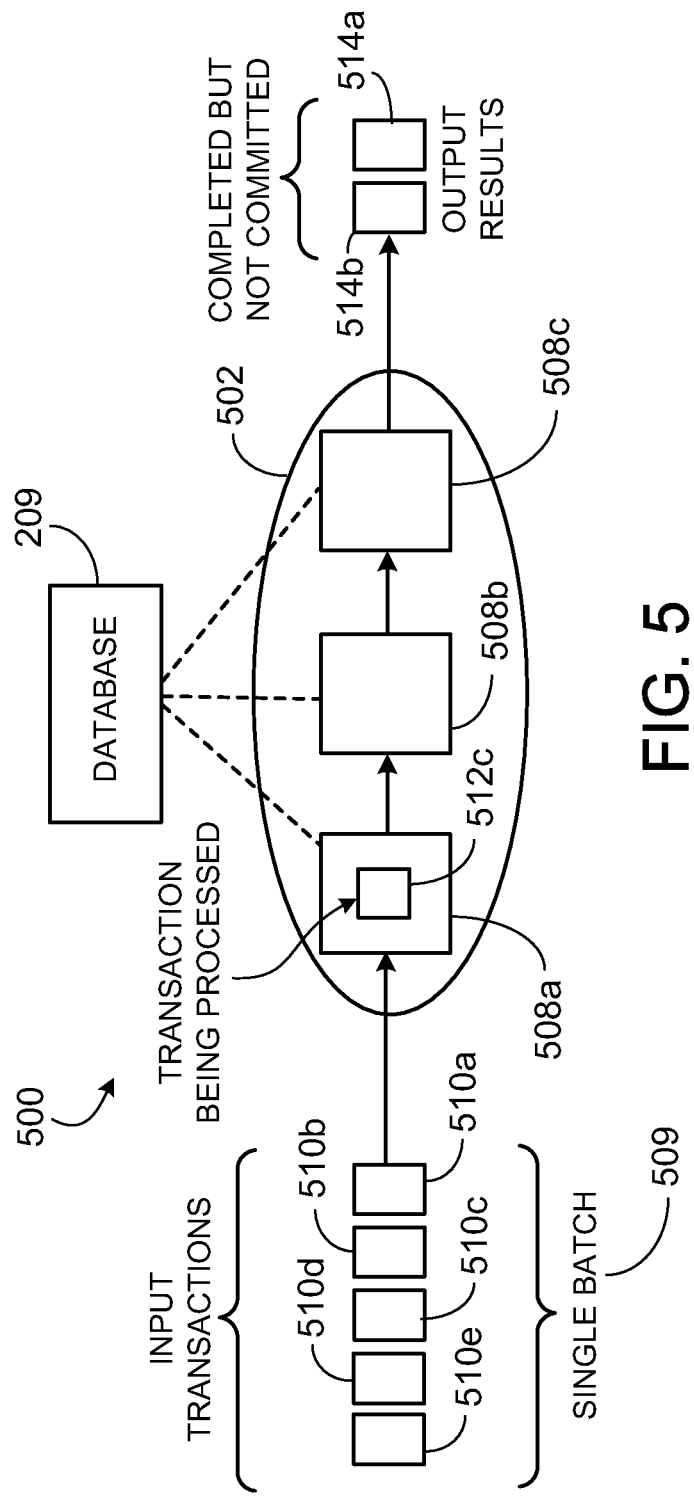
FIG. 5 is an example scenario of transaction processing.

In some implementations, commit operations are not performed after each transaction, but rather are delayed and performed for a batch of transactions at once. In the following example, a "batch" refers to a batch of multiple transactions and their corresponding units of work, each made up of records to be processed in those transactions. Referring now to FIG. 5, an example scenario shows a portion of a dataflow graph 500 including a set 502 of components in a TU for receiving and processing a batch 509 of units of work 510a-e. As shown, the set 502 has queued the batch 509 having 5 input units of work 510a-e for processing. In the course of executing the batch 509, the components 508a-c share a common session with the database system 209. Input transactions for units of work 510a and 510b are shown to have already been processed by the set 502 as processed results 514a and 514b of those transactions, and have been marked as being completed (but not committed). Further, input unit of work 510c is currently being processed in component 508a as unit of work 512c. During the processing by the components 508, the records included in the unit of work 512c may change relative to the records included in the input unit of work 510c, however, both correspond to the records associated with a given transaction at different points in time. As described above, only one unit of work for a given transaction is processed by the components of the TU at a time.

If a failure were to occur during processing of the transaction for unit of work 512c, the changes represented by the results 514a and 514b of the previously processed transactions would be rolled back. Input units of work 510a and 510b that correspond to these results 514a and 514b of the processed transactions are still available at the input of the set 502. In some implementations, when a failure occurs, the transactions corresponding to the units of work 510a-e can be re-processed by unbundling the batch 509. That is, each transaction corresponding to the units of work 510a-e, including associated data records and operations, in the batch 509 can be processed separately and changes to the database 209 based on one or more individual transactions can be committed before processing the next transaction. In some implementations, since the failed transaction can be identified, e.g., transaction corresponding to input unit of work 510c (or processed unit of work 512c), the transactions including associated data records and operations in the batch 509 can be re-processed as a new batch 509 without the failed transaction and associated data records (of input unit of work 510c) and operations. In some implementations, the failed transaction can be processed alone, and the rest of the transactions in the batch 509 can be divided into two or more smaller batches of transactions (not shown) and processed one after the other. For example, the transactions corresponding to units of work 510a and 510b can be processed as a first batch, and the transaction corresponding to units of work 510d and 510e can be processed as a second batch.

Figure 6:
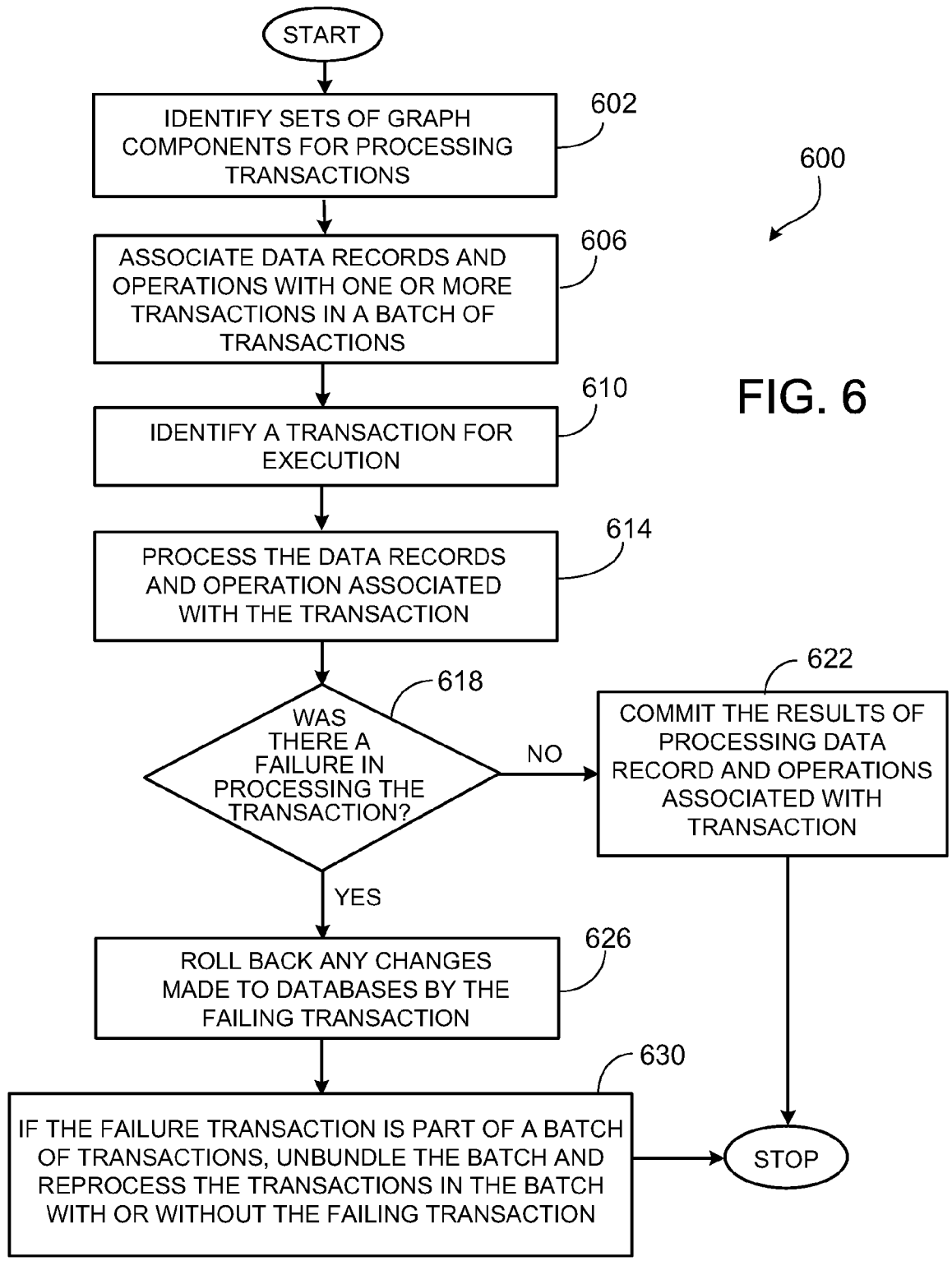
FIG. 6 is a flowchart showing an example process of preparing a dataflow graph and execution a transaction in the dataflow graph.

Referring now to FIG. 6, a flowchart 600 for preparing a graph-based computation and executing a transaction in the computation is shown. One or more sets of components (e.g., set 402 of components 406 in FIG. 4) are identified for processing one or more transactions. (Step 602) As described above, a Transactional Unit (TU) can be identified through a component configured to dynamically invoke the set 402 of components 406, or delimited through the use of one or more special components (e.g., component 240 and 255 in FIG. 2).

Data records and their corresponding data operations are associated with transactions in a batch of transactions to be processed by the TU. (Step 606) For example, a transaction 414 (FIG. 4) is associated with data records 312 and corresponding operations. In some examples, a user 103 can specify a transaction size (i.e., a number of data records 312) for each transaction 414 in a batch of transactions, or the pre-execution module 110 (FIG. 1) can automatically group the data records 312 and corresponding operations into a transaction. A transaction 414 is then selected for execution by the set 402 of components. (Step 610) The transactions can be executed by processing the data records 312 for each transaction as a unit (Step 614).

During processing of the transaction 414, a failure may occur. As described above, a data record 312 and its associated data operation can fail for a variety of reasons including, e.g., system failures and/or operational failures. Accordingly, while the transaction 414 is being processed, the transaction 414 can be checked for such failures, or other errors. (Step 618) If no failure is detected, then the results of processing the data records 312 and corresponding data operations associated with the transaction 414 are committed as a single unit. (Step 622) If a failure were to occur in the processing of the transaction 414, then any changes made to the corresponding databases (e.g., database 209 in FIG. 3) need to be rolled back. (Step 626). Further, if the failing transaction 414 is being processed in a batch of multiple transactions being committed together, the failed batch of transactions can be unbundled and the data records 312 and associated data operations corresponding to the individual transactions in the batch can be re-processed individually with or without the failing transaction. (Step 630) In some implementations, the transactions in the failing batch can be re-processed either individually (with the changes committed to the database 209 after re-processing each transaction 414), or using an alternative technique described above.

The techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A computer-implemented method, including:
preparing a graph-based computation having a plurality of nodes representing graph components connected by one or more links representing data flows between the graph components, including:
identifying at least a first set of multiple graph components to process a plurality of transactions in the computation; and
associating with a first transaction a first group of one or more data records and data operations corresponding to the data records, and associating with a second transaction a second group of one or more data records and data operations corresponding to the data records; and
executing the graph-based computation to process at least the first and second transactions, including delaying execution by the first set of multiple graph components of a data operation corresponding to an initial data record of the second group until after execution by the first set of multiple graph components of a data operation corresponding to a final data record of the first group.

2. The method of claim 1 wherein executing the graph-based computation further includes:
executing the first and second transactions as a first batch of transactions by:
processing the data records and data operations corresponding to the first and second transactions; and
upon detecting a failure, rolling back the first batch of transactions by rolling back all processed data records and data operations corresponding to the processed transactions.

3. The method of claim 1 further including:
specifying a first graph component having at least an output port as a beginning of a data flow for the first set of multiple graph components; and
specifying a second graph component having at least an input port as an end of the data flow for the first set of multiple graph components.

4. The method of claim 1 further including dynamically invoking the first set of multiple graph components to process the one or more transactions.

5. The method of claim 1 further including, upon successfully processing substantially all transactions in the first batch of transactions, committing the first batch of transactions.

6. The method of claim 5 in which committing the first batch of transactions includes committing all the data operations corresponding to each one of the transactions in the first batch of transactions at substantially the same time.

7. The method of claim 2 in which detecting a failure includes detecting a failure of any of the data operations corresponding to each one of the data records in a transaction of the first batch of transactions.

8. The method of claim 2 further including after detecting the failure, re-processing, as a second different batch of transactions, unprocessed transactions of the first batch of transactions and the processed transactions that were not committed during processing of the first batch of transactions.

9. The method of claim 2 further including, after detecting the failure, re-processing, as a series of discrete batches, each one of the processed and unprocessed transactions associated with the first batch of transactions.

10. The method of claim 2 further including:
upon detecting the failure, identifying one or more transactions that failed as failed transactions,
re-processing, as a second different batch, the first batch of transactions excluding the failed transactions, and
re-processing, as third batch, the failed transactions.

11. The method of claim 2 further including, in the course of executing the first transaction, performing one or more data operations in a first database by a set of graph components belonging to the graph-based computation.

12. The method of claim 11 further including, in the course of executing the first transaction, establishing a first session with the first database, the first session being shared by one or more of a first set of graph components processing the first transaction.

13. The method of claim 2 in which a size of the first transactions is specified by a user.

14. A non-transitory computer-readable non-transitory storage device storing a computer program, the computer program including instructions for causing a computer to:
prepare a graph-based computation having a plurality of nodes representing graph components connected by one or more links representing data flows between the graph components, including:
identifying at least a first set of multiple graph components to process a plurality of transactions in the computation; and
associating with a first transaction a first group of one or more data records and data operations corresponding to the data records, and associating with a second transaction a second group of one or more data records and data operations corresponding to the data records; and
execute the graph-based computation to process at least the first and second transactions, including delaying execution by the first set of multiple graph components of a data operation corresponding to an initial data record of the second group until after execution by the first set of multiple graph components of a data operation corresponding to a final data record of the first group.

15. The non-transitory computer-readable non-transitory storage device of claim 14 wherein executing the graph-based computation further includes:
executing the first and second transactions as a first batch of transactions by:
processing the data records and data operations corresponding to the first and second transactions; and upon detecting a failure, rolling back the first batch of transactions by rolling back all processed data records and data operations corresponding to the processed transactions.

16. The non-transitory computer-readable non-transitory storage device of claim 14, wherein the computer program further includes instructions for causing a computer to:
specify a first graph component having at least an output port as a beginning of a data flow for the first set of multiple graph components; and
specify a second graph component having at least an input port as an end of the data flow for the first set of multiple graph components.

17. The non-transitory computer-readable non-transitory storage device of claim 14 wherein the computer program further includes instructions for causing a computer to dynamically invoke the first set of multiple graph components to process the one or more transactions.

18. The non-transitory computer-readable non-transitory storage device of claim 14 wherein the computer program further includes instructions for causing a computer to, upon successfully processing substantially all transactions in the first batch of transactions, commit the first batch of transactions.

19. The non-transitory computer-readable non-transitory storage device of claim 18 in which committing the first batch of transactions includes committing all the data operations corresponding to each one of the transactions in the first batch of transactions at substantially the same time.

20. The non-transitory computer-readable non-transitory storage device of claim 15 in which detecting a failure includes detecting a failure of any of the data operations corresponding to each one of the data records in a transaction of the first batch of transactions.

21. The non-transitory computer-readable non-transitory storage device of claim 15 wherein the computer program further includes instructions for causing a computer to, after detecting the failure, re-process, as a second different batch of transactions, unprocessed transactions of the first batch of transactions and the processed transactions that were not committed during processing of the first batch of transactions.

22. The non-transitory computer-readable non-transitory storage device of claim 15 wherein the computer program further includes instructions for causing a computer to, after detecting the failure, re-process, as a series of discrete batches, each one of the processed and unprocessed transactions associated with the first batch of transactions.

23. The non-transitory computer-readable non-transitory storage device of claim 15 wherein the computer program further includes instructions for causing a computer to:
upon detecting the failure, identify one or more transactions that failed as failed transactions,
re-process, as a second different batch, the first batch of transactions excluding the failed transactions, and
re-process, as third batch, the failed transactions.

24. The non-transitory computer-readable non-transitory storage device of claim 15 wherein the computer program further includes instructions for causing a computer to, in the course of executing the first transaction, perform one or more data operations in a first database by a set of graph components belonging to the graph-based computation.

25. The non-transitory computer-readable non-transitory storage device of claim 24 wherein the computer program further includes instructions for causing a computer to, in the course of executing the first transaction, establish a first session with the first database, the first session being shared by one or more of a first set of graph components processing the first transaction.

26. The non-transitory computer-readable non-transitory storage device of claim 15 in which a size of the first transactions is specified by a user.

27. A system, including:
a computing system, including:
means for preparing a graph-based computation having a plurality of nodes representing graph components connected by one or more links representing data flows between the graph components, including:
identifying at least a first set of multiple graph components to process a plurality of transactions in the computation; and
associating with a first transaction a first group of one or more data records and data operations corresponding to the data records, and associating with a second transaction a second group of one or more data records and data operations corresponding to the data records; and
means for executing the graph-based computation to process at least the first and second transactions, including delaying execution by the first set of multiple graph components of a data operation corresponding to an initial data record of the second group until after execution by the first set of multiple graph components of a data operation corresponding to a final data record of the first group.

28. The system of claim 27 wherein the means for executing the graph-based computation further includes:
means for executing the first and second transactions as a first batch of transactions by:
processing the data records and data operations corresponding to the first and second transactions; and
upon detecting a failure, rolling back the first batch of transactions by rolling back all processed data records and data operations corresponding to the processed transactions.

29. The system of claim 27 further including:
means for specifying a first graph component having at least an output port as a beginning of a data flow for the first set of multiple graph components; and
means for specifying a second graph component having at least an input port as an end of the data flow for the first set of multiple graph components.

30. The system of claim 27 further including means for dynamically invoking the first set of multiple graph components to process the one or more transactions.

31. The system of claim 27 further including means for, upon successfully processing substantially all transactions in the first batch of transactions, committing the first batch of transactions.

32. The system of claim 31 in which committing the first batch of transactions includes committing all the data operations corresponding to each one of the transactions in the first batch of transactions at substantially the same time.

33. The system of claim 28 in which detecting a failure includes detecting a failure of any of the data operations corresponding to each one of the data records in a transaction of the first batch of transactions.

34. The system of claim 28 further including means for, after detecting the failure, re-processing, as a second different batch of transactions, unprocessed transactions of the first batch of transactions and the processed transactions that were not committed during processing of the first batch of transactions.

35. The system of claim 28 further including means for, after detecting the failure, re-processing, as a series of discrete batches, each one of the processed and unprocessed transactions associated with the first batch of transactions.

36. The system of claim 28 further including:
means for, upon detecting the failure, identifying one or more transactions that failed as failed transactions,
means for re-processing, as a second different batch, the first batch of transactions excluding the failed transactions, and
means for re-processing, as third batch, the failed transactions.

37. The system of claim 28 further including means for, in the course of executing the first transaction, performing one or more data operations in a first database by a set of graph components belonging to the graph-based computation.

38. The system of claim 37 further including means for, in the course of executing the first transaction, establishing a first session with the first database, the first session being shared by one or more of a first set of graph components processing the first transaction.

39. The system of claim 28 in which a size of the first transactions is specified by a user.

40. A computing system, including:
at least one processor configured to:
prepare a graph-based computation having a plurality of nodes representing graph components connected by one or more links representing data flows between the graph components, including:
identifying at least a first set of multiple graph components to process a plurality of transactions in the computation; and
associating with a first transaction a first group of one or more data records and data operations corresponding to the data records, and associating with a second transaction a second group of one or more data records and data operations corresponding to the data records; and
execute the graph-based computation to process at least the first and second transactions, including delaying execution by the first set of multiple graph components of a data operation corresponding to an initial data record of the second group until after execution by the first set of multiple graph components of a data operation corresponding to a final data record of the first group.

41. The computing system of claim 40 wherein executing the graph-based computation further includes:
executing the first and second transactions as a first batch of transactions by:
processing the data records and data operations corresponding to the first and second transactions; and
upon detecting a failure, rolling back the first batch of transactions by rolling back all processed data records and data operations corresponding to the processed transactions.

42. The computing system of claim 40 wherein the processor is further configured to:
specify a first graph component having at least an output port as a beginning of a data flow for the first set of multiple graph components; and
specify a second graph component having at least an input port as an end of the data flow for the first set of multiple graph components.

43. The computing system of claim 40 wherein the processor is further configured to dynamically invoke the first set of mulitple graph components to process the one or more transactions.

44. The computing system of claim 40 wherein the processor is further configured to, upon successfully processing substantially all transactions in the first batch of transactions, commit the first batch of transactions.

45. The computing system of claim 44 in which committing the first batch of transactions includes committing all the data operations corresponding to each one of the transactions in the first batch of transactions at substantially the same time.

46. The computing system of claim 41 in which detecting a failure includes detecting a failure of any of the data operations corresponding to each one of the data records in a transaction of the first batch of transactions.

47. The computing system of claim 41 wherein the processor is further configured to, after detecting the failure, re-process, as a second different batch of transactions, unprocessed transactions of the first batch of transactions and the processed transactions that were not committed during processing of the first batch of transactions.

48. The computing system of claim 41 wherein the processor is further configured to, after detecting the failure, re-process, as a series of discrete batches, each one of the processed and unprocessed transactions associated with the first batch of transactions.

49. The computing system of claim 41 wherein the processor is further configured to:
upon detecting the failure, identify one or more transactions that failed as failed transactions,
re-process, as a second different batch, the first batch of transactions excluding the failed transactions, and
re-process, as third batch, the failed transactions.

50. The computing system of claim 41 wherein the processor is further configured to, in the course of executing the first transaction, perform one or more data operations in a first database by a set of graph components belonging to the graph-based computation.

51. The computing system of claim 50 wherein the processor is further configured to, in the course of executing the first transaction, establish a first session with the first database, the first session being shared by one or more of a first set of graph components processing the first transaction.

52. The computing system of claim 41 in which a size of the first transactions is specified by a user.

* * * * *

UNITED STATES PATENT AND TRADEMARK OFFICE
CERTIFICATE OF CORRECTION

| | | |
|---|---|---|
| PATENT NO. | : 8,667,329 B2 | Page 1 of 1 |
| APPLICATION NO. | : 12/638588 | |
| DATED | : March 4, 2014 | |
| INVENTOR(S) | : Bryan Phil Douros et al. | |

It is certified that error appears in the above-identified patent and that said Letters Patent is hereby corrected as shown below:

In the Claims

Column 12, line 38, in claim 14, after "computer-readable" delete "non-transitory"

Column 12, line 61, in claim 15, after "computer-readable" delete "non-transitory"

Column 13, line 5, in claim 16, after "computer-readable" delete "non-transitory"

Column 13, line 15, in claim 17, after "computer-readable" delete "non-transitory"

Column 13, line 20, in claim 18, after "computer-readable" delete "non-transitory"

Column 13, line 26, in claim 19, after "computer-readable" delete "non-transitory"

Column 13, line 31, in claim 20, after "computer-readable" delete "non-transitory"

Column 13, line 36, in claim 21, after "computer-readable" delete "non-transitory"

Column 13, line 44, in claim 22, after "computer-readable" delete "non-transitory"

Column 13, line 50, in claim 23, after "computer-readable" delete "non-transitory"

Column 13, line 58, in claim 24, after "computer-readable" delete "non-transitory"

Column 13, line 64, in claim 25, after "computer-readable" delete "non-transitory"

Column 14, line 4, in claim 26, after "computer-readable" delete "non-transitory"

Column 14, line 7, in claim 27, after "A" insert -- computer --

Column 16, line 11, in claim 43, delete "mulitple" and insert -- multiple --

Signed and Sealed this
Third Day of June, 2014

Michelle K. Lee
*Deputy Director of the United States Patent and Trademark Office*